United States Patent
Ryu et al.

(10) Patent No.: US 11,594,216 B2
(45) Date of Patent: Feb. 28, 2023

(54) ELECTRONIC DEVICE AND CONTROL METHOD THEREOF

(71) Applicant: SAMSUNG ELECTRONICS CO., LTD., Suwon-si (KR)

(72) Inventors: Young Jun Ryu, Suwon-si (KR); Jae Hyun Bae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 34 days.

(21) Appl. No.: 16/766,071

(22) PCT Filed: Oct. 31, 2018

(86) PCT No.: PCT/KR2018/013058
§ 371 (c)(1),
(2) Date: May 21, 2020

(87) PCT Pub. No.: WO2019/103340
PCT Pub. Date: May 31, 2019

(65) Prior Publication Data
US 2020/0349939 A1    Nov. 5, 2020

(30) Foreign Application Priority Data

Nov. 24, 2017  (KR) .................. 10-2017-0158769

(51) Int. Cl.
*G10L 15/22* (2006.01)
*G10L 15/07* (2013.01)
*G10L 15/30* (2013.01)

(52) U.S. Cl.
CPC .............. *G10L 15/22* (2013.01); *G10L 15/07* (2013.01); *G10L 15/30* (2013.01); *G10L 2015/223* (2013.01)

(58) Field of Classification Search
USPC ...................................... 704/1–504
See application file for complete search history.

(56) References Cited

U.S. PATENT DOCUMENTS

| 10,553,219 B2 * | 2/2020 | Jung ................. G10L 15/22 |
| 2011/0112836 A1 * | 5/2011 | Kurki-Suonio ... H04M 3/42221 704/235 |

(Continued)

FOREIGN PATENT DOCUMENTS

| EP | 3 444 811 | 2/2019 |
| KR | 10-0612839 | 8/2006 |

(Continued)

OTHER PUBLICATIONS

Extended European Search Report dated Oct. 30, 2020 from European Application No. 18880674.9, 7 pages.

(Continued)

*Primary Examiner* — Marcus T Riley
(74) *Attorney, Agent, or Firm* — Staas & Halsey LLP

(57) ABSTRACT

The disclosure relates an electronic apparatus. The electronic apparatus comprises a voice receiver configured to receive a voice of a speaker; and a processor configured to perform a predetermined operation, obtain a recognition result by applying a voice recognition process to the voice received in the voice receiver during the operation, and perform control based on a standard recognition result previously defined corresponding to at least one pseudo recognition result, based on the obtained recognition result matching the pseudo recognition result previously defined corresponding to the operation.

15 Claims, 7 Drawing Sheets

(56) References Cited

U.S. PATENT DOCUMENTS

| | | | | |
|---|---|---|---|---|
| 2011/0112837 | A1* | 5/2011 | Kurki-Suonio | G10L 15/22 |
| | | | | 704/235 |
| 2013/0290001 | A1* | 10/2013 | Yun | H04N 21/4415 |
| | | | | 704/275 |
| 2013/0311182 | A1 | 11/2013 | Kim et al. | |
| 2015/0032459 | A1* | 1/2015 | Gazdzinski | G06Q 30/02 |
| | | | | 704/275 |
| 2015/0205779 | A1 | 7/2015 | Bak et al. | |
| 2017/0076724 | A1* | 3/2017 | Park | G06F 16/00 |
| 2017/0084278 | A1* | 3/2017 | Jung | G10L 15/22 |
| 2017/0229124 | A1 | 8/2017 | Strohman et al. | |
| 2020/0349939 | A1* | 11/2020 | Ryu | G10L 15/32 |

FOREIGN PATENT DOCUMENTS

| | | |
|---|---|---|
| KR | 10-2011-0012920 | 2/2011 |
| KR | 10-2011-0032394 | 3/2011 |
| KR | 10-2015-0086086 | 7/2015 |
| KR | 10-2016-0010961 | 1/2016 |

OTHER PUBLICATIONS

International Search Report dated Feb. 14, 2019 from International Application No. PCT/KR2018/013058, 4 pages.
Korean Office Action dated Nov. 30, 2021 from Korean Application No. 10-2017-0158769.
European Office Action dated May 9, 2022 from European Application No. 18880674.9.
Indian Office Action dated Mar. 28, 2022 from Indian Application No. 202017023462.

* cited by examiner

ELECTRONIC DEVICE AND CONTROL METHOD THEREOF

CROSS-REFERENCE TO RELATED APPLICATIONS

This application is a U.S. National Stage Application which claims the benefit under 35 U.S.C. § 371 of International Patent Application No. PCT/KR2018/013058 filed on Oct. 31, 2018, which claims foreign priority benefit under 35 U.S.C. § 119 of Korean Patent Application No. 10-2017-0158769 filed on Nov. 24, 2017 in the Korean Intellectual Property Office, the contents of each of which are incorporated herein by reference.

TECHNICAL FIELD

The disclosure relates to an electronic apparatus and a method of controlling the electronic apparatus.

BACKGROUND ART

A speaker may use a voice control function to control an electronic apparatus. The voice control function refers to a function of controlling the electronic apparatus to perform a specific operation based on a recognition result when a speaker plans on the specific operation of the electronic apparatus and utters a voice corresponding to the specific operation.

However, when there is an error in the recognition result, the electronic apparatus may perform an operation mismatched with utterance intention. Therefore, the electronic apparatus needs to perform the specific operation corresponding to the utterance intention even though an error is present in the recognition result.

Technical Problem

Accordingly, an aspect of the disclosure is to provide an electronic apparatus and a method of controlling the electronic apparatus, in which a specific operation corresponding to utterance intention is performed even though there is an error in a recognition result.

Technical Solution

According to an embodiment of the disclosure, there is provided an electronic apparatus comprising: a voice receiver configured to receive a voice of a speaker; and a processor configured to perform a predetermined operation, obtain a recognition result by applying a voice recognition process to the voice received in the voice receiver during the operation, and perform control based on a standard recognition result previously defined corresponding to at least one pseudo recognition result, based on the obtained recognition result matching the pseudo recognition result previously defined corresponding to the operation.

The processor is configured to select at least one correction model corresponding to the performed operation among a plurality of correction models respectively provided according to the operations.

The processor is configured to identify whether the obtained recognition result matches the at least one previously defined pseudo recognition result of the at least one selected correction model.

The processor is configured to identify whether the obtained recognition result matches the standard recognition result previously defined corresponding to the pseudo recognition result of the at least one selected correction model.

Further comprising a storage configured to store the plurality of correction models respectively provided according to the operations.

According to another embodiment of the disclosure, there is provided a method of controlling an electronic apparatus comprising a voice receiver configured to receive a voice of a speaker, the method comprising: performing a predetermined operation; obtaining a recognition result by applying a voice recognition process to the voice received in the voice receiver during the operation; and performing control based on a standard recognition result previously defined corresponding to at least one pseudo recognition result, based on the obtained recognition result matching the pseudo recognition result previously defined corresponding to the operation.

The performing of the control comprises selecting at least one correction model corresponding to the performed operation among a plurality of correction models respectively provided according to the operations.

The performing of the control comprises identifying whether the obtained recognition result matches the at least one previously defined pseudo recognition result of the at least one selected correction model.

The identifying comprises identifying whether the obtained recognition result matches the standard recognition result previously defined corresponding to the pseudo recognition result of the at least one selected correction model.

Further comprising storing the plurality of correction models respectively provided according to the operations.

According to another embodiment of the disclosure, there is provided a voice recognition system comprising an electronic apparatus and a voice recognition server, the electronic apparatus comprising a voice receiver configured to receive a voice of a speaker, and the voice recognition server comprising: a communicator configured to communicate with the electronic apparatus; and a processor configured to receive the voice, which is received in the voice receiver during a predetermined operation of the electronic apparatus that performs the operation, through the communicator, obtain a recognition result by applying a voice recognition process to the received voice, and perform control based on a standard recognition result previously defined corresponding to at least one pseudo recognition result, based on the obtained recognition result matching the pseudo recognition result previously defined corresponding to the operation.

The processor of the voice recognition server is configured to select at least one correction model corresponding to the performed operation among a plurality of correction models respectively provided according to the operations.

The processor of the voice recognition server is configured to identify whether the obtained recognition result matches the at least one previously defined pseudo recognition result of the at least one selected correction model.

The processor of the voice recognition server is configured to identify whether the obtained recognition result matches the standard recognition result previously defined corresponding to the pseudo recognition result of the at least one selected correction model.

According to another embodiment of the disclosure, there is provided a recording medium stored with a computer program comprising a code for carrying out a method of controlling an electronic apparatus comprising a voice receiver configured to receive a voice of a speaker, as a computer readable code, the method comprising: performing a predetermined operation; obtaining a recognition result by applying a voice recognition process to the voice received in the voice receiver during the operation; and performing control based on a standard recognition result previously defined corresponding to at least one pseudo recognition result, based on the obtained recognition result matching the pseudo recognition result previously defined corresponding to the operation.

Advantageous Effects

According to the disclosure, there are provided an electronic apparatus and a method of controlling the electronic apparatus, in which a specific operation corresponding to utterance intention is performed even though there is an error in a recognition result.

BEST MODE

Figure 1:
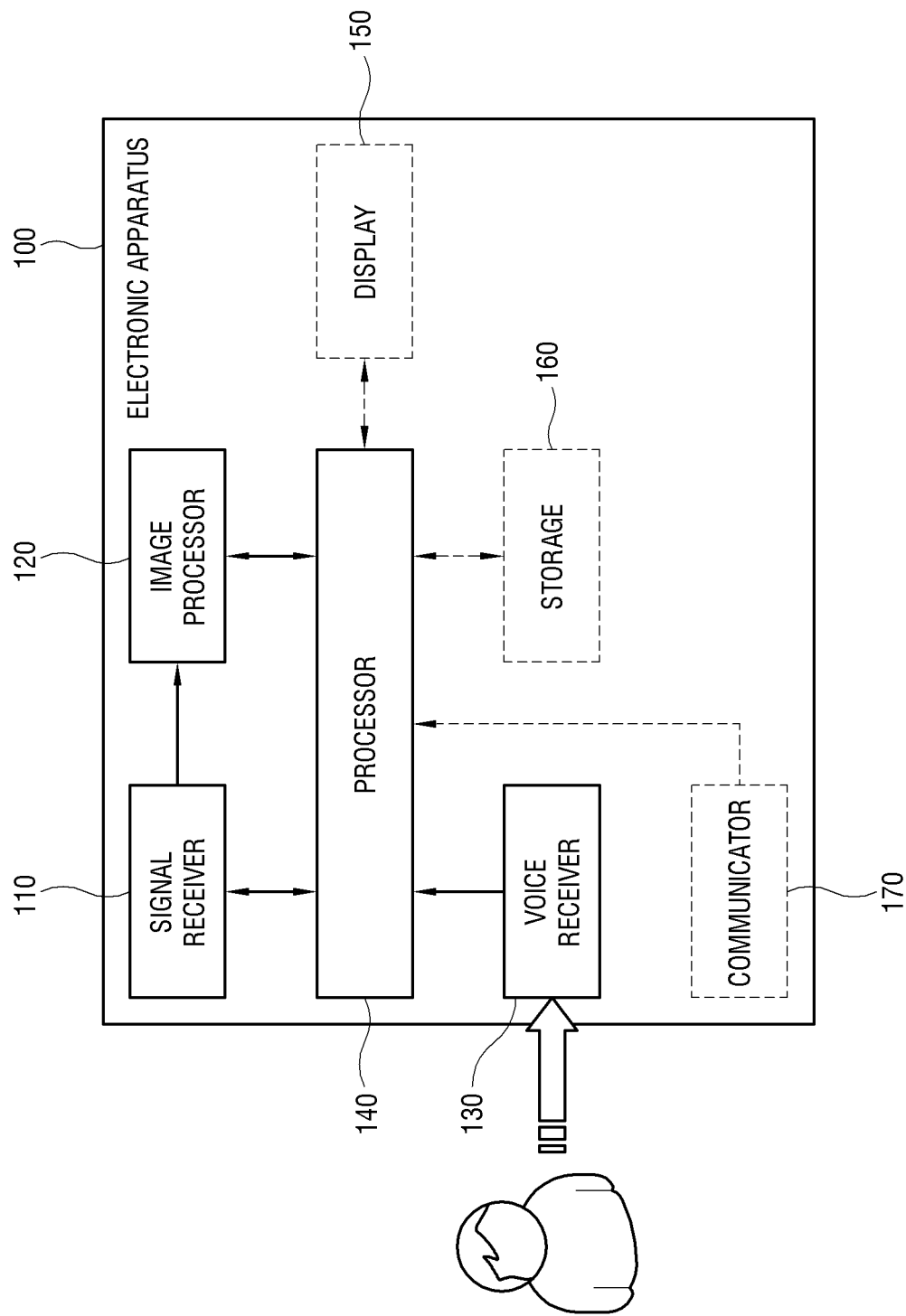
FIG. 1 is a block diagram of an electronic apparatus according to an embodiment of the disclosure.

Below, embodiments of the disclosure will be described in detail with reference to accompanying drawings. In the description of the following embodiments, elements illustrated in the accompanying drawings will be referenced, and like numerals or symbols set forth in the drawings refer to like elements having substantially the same function. In the disclosure, at least one among a plurality of elements refers to not only all the plurality of elements but also both each one of the plurality of elements excluding the other elements and a combination thereof.

FIG. 1 is a block diagram of an electronic apparatus according to an embodiment of the disclosure. As shown in FIG. 1, an electronic apparatus 100 may include a signal receiver 110, an image processor 120, a voice receiver 130, and a processor 140. As necessary, the electronic apparatus 100 may further include at least one of a display 150, a storage 160 and a communicator 170. The electronic apparatus 100 may be embodied by an apparatus without limitations as long as it can perform a specific operation corresponding to a voice of a speaker. For example, the electronic apparatus 100 may be embodied by a set-top box, a smart TV, a smartphone, a smart watch, a wearable device, a tablet computer, a personal computer (PC), etc.

The signal receiver 110 receives an image signal through at least one channel. The signal receiver 110 may be variously embodied according to the formats of the image signal to be received and the types of electronic apparatus 100. For example, the signal receiver 110 may be embodied by a tuner that receives a radio frequency (RF) broadcast signal from a broadcasting station.

The image processor 120 processes a received image signal by a preset image processing process. For example, the image processor 120 may perform decoding, de-interlacing, scaling, noise reduction, detail enhancement, and the like image processing processes, but the processes of the image processor 120 are not limited to these examples. The image processor 120 may be embodied by a system-on-chip into which various functions are integrated, or an image processing board to which individual elements capable of performing the processes independently of each other are mounted.

The voice receiver 130 receives a voice uttered by a speaker. The voice receiver 130 receives a voice of a speaker as a kind of voice signal, and the voice signal of the speaker may be extracted by a frequency analysis or the like preprocessing process because the received voice signal may include various noises besides the voice of the speaker targeted for voice recognition. The voice receiver 130 may be embodied by a microphone.

The processor 140 may control general elements of the electronic apparatus 100 so that the electronic apparatus 100 can perform predetermined operations. The processor 140 may apply a voice recognition process to a voice received in the voice receiver 130 while the electronic apparatus 100 performs a predetermined operation. The processor 140 may obtain a recognition result through the voice recognition process, and control the electronic apparatus 100 to perform another operation based on the obtained recognition result. The processor 140 may be embodied by a central processing unit (CPU) or a micro-processor.

The display 150 displays an image based on an image signal output from the image processor 120. There are no limits to the types of display 150, and the display 150 may be embodied by various types such as a plasma display panel (PD), a liquid crystal display (LCD), a light emitting diode (LED), an organic light emitting diode (OLED), a flexible display, etc.

The storage 160 refers to a nonvolatile memory such as a flash memory, a hard disk, etc., which is configured to store an image signal, a voice signal, a program, an application and the like related to the operations of the electronic apparatus 100. The communicator 170 may connect and communicate with an external apparatus 200 or an external voice recognition server 300. The communicator 170 may use various communication standards, such as Wi-Fi, Bluetooth, ZigBee, Wi-Fi Direct (WFD), ultra-wideband (UWB), infrared Data Association (IrDA), Bluetooth low energy (BLE), near field communication (NFC), etc.

Figure 2:
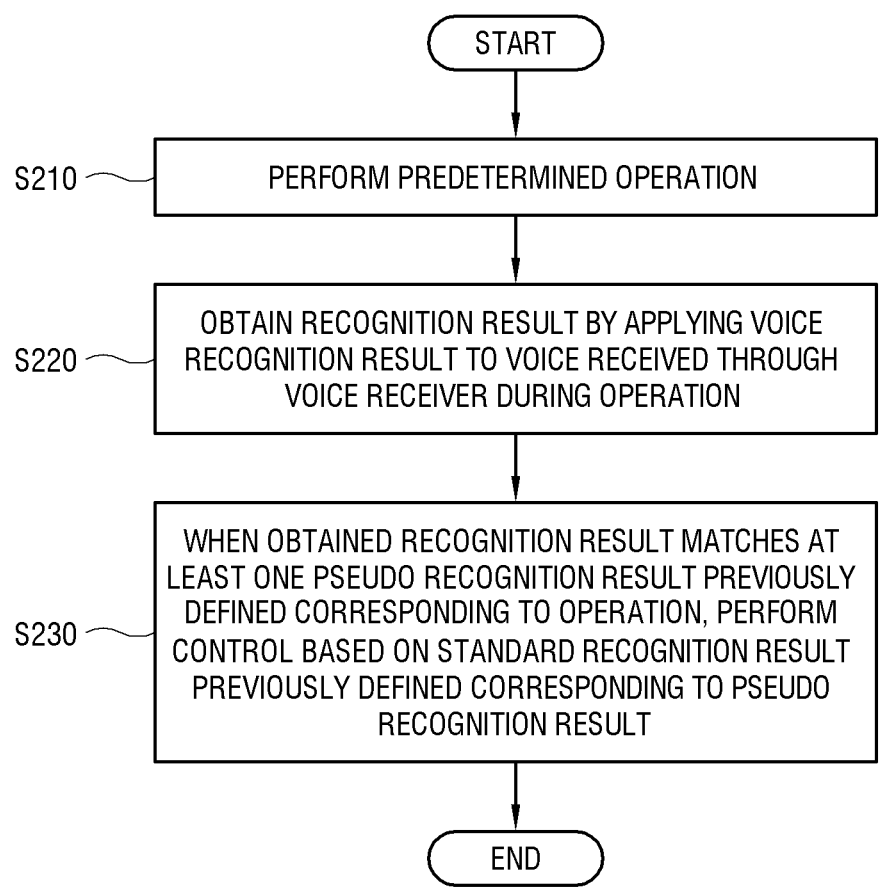
FIG. 2 is a flowchart showing a method of controlling the electronic apparatus of FIG. 1.

FIG. 2 is a flowchart showing a method of controlling the electronic apparatus of FIG. 1. As shown in FIG. 2, the electronic apparatus 100 performs a predetermined operation under control of the processor 140 (S210). The electronic apparatus 100 obtains a recognition result by applying a voice recognition process to a voice received in the voice receiver 130 during the predetermined operation (S220).

Further, when the obtained recognition result matches at least one pseudo recognition result previously defined corresponding to the operation of the electronic apparatus 100, the electronic apparatus 100 may perform control based on the standard recognition result previously defined corresponding to the pseudo recognition result (S230). Thus, the electronic apparatus 100 can perform a specific operation based on the utterance intention even though there is an error in the recognition result.

Figure 3:
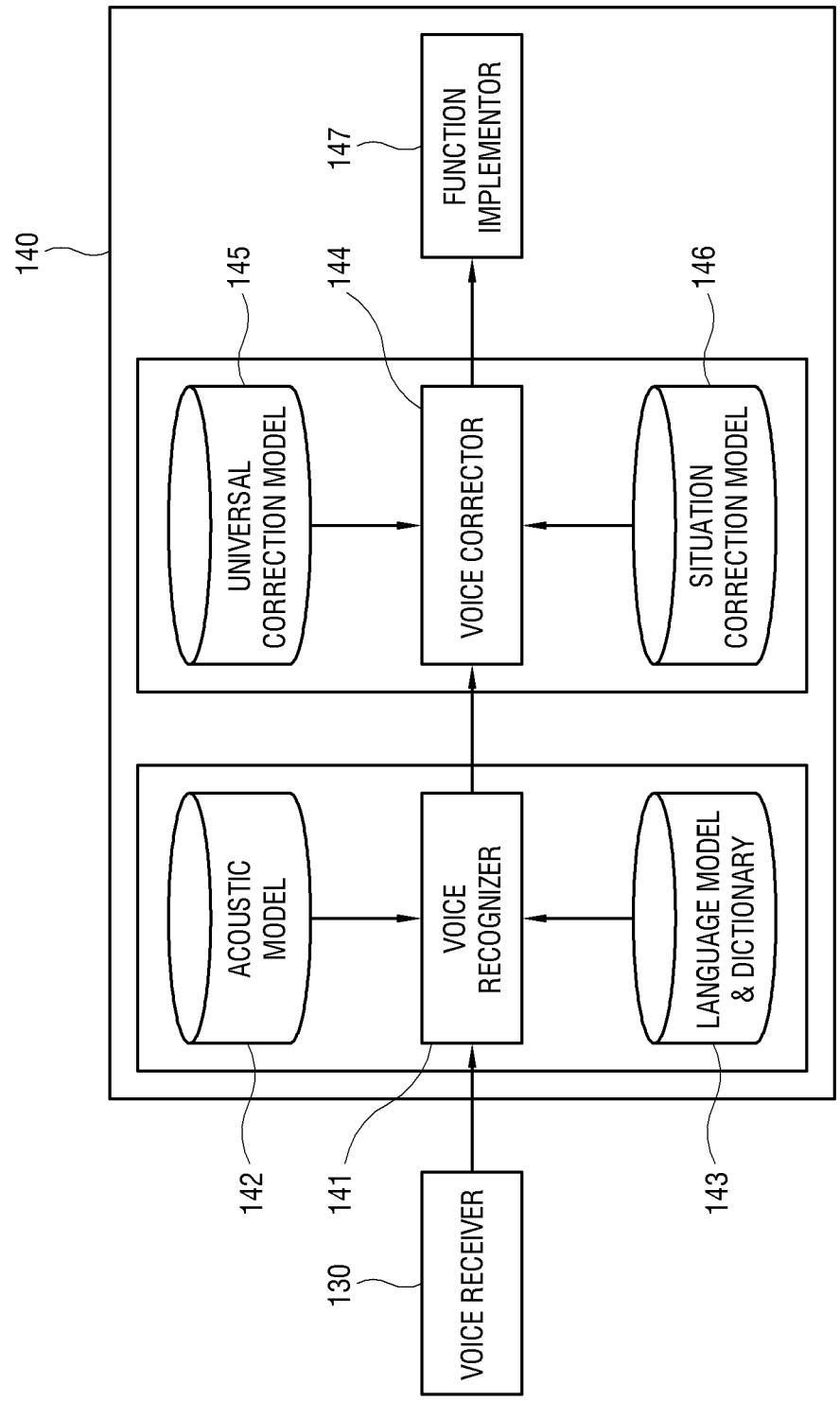
FIG. 3 is a block diagram of a processor in the electronic apparatus of FIG. 1.

FIG. 3 is a block diagram of a processor in the electronic apparatus of FIG. 1. As shown in FIG. 3, the electronic apparatus 100 of FIG. 1 includes the processor 140, and the processor 140 may include a voice recognizer 141, a voice corrector 144, and a function implementor 147. Because there are no limits to the elements of the processor 140, at least one of these elements may be excluded or another element may be added to the processor 140.

The voice recognizer 141 may include an acoustic model, a language model, a dictionary, etc. The voice recognizer 141 receives a voice signal from the voice receiver 130, and uses an acoustic model 142, and a language model & dictionary 143 to apply a voice recognition process to the received voice signal, thereby outputting a recognition result.

The acoustic model 142 may include information for detecting candidate pronunciation from characteristic information of the voice signal. The candidate pronunciation may be detected in units of ward, but not limited thereto. Alternatively, the candidate pronunciation may be detected in various units of phoneme, phone, etc. The acoustic model 142 may be generated based on a lot of voice signals by a statistical method, based on voice signals of many random people, or based on voice signals collected from a specific speaker. Therefore, the acoustic model 142 may be individually applied according to speakers during the voice recognition process.

The language model & dictionary 143 may be configured to store a dictionary about pronunciation and a language model, i.e. a grammatical model used by the voice recognizer 141 during the voice recognition process. The speakers may be different in use language, dialect, grammatical structure, word, etc. according to nationalities or residential areas, ages, linguistic habits, etc. Therefore, the language model & dictionary 143 may include one or more language models and one or more dictionaries.

However, due to diversity, variability, nonnormality, irregularity, etc. of an uttered voice, there may be misrecognition or the like error in the recognition result even though the voice recognizer 141 broadly employs the acoustic model 142 and the language model & dictionary 143 to apply the voice recognition process to the received voice signal.

The voice corrector 144 obtains a recognition result from the voice recognizer 141, and corrects an error of the obtained recognition result. The voice corrector 144 may employ different methods of correcting the error of the recognition result according to whether operation information is obtained or not. The operation information refers to information about operations performed by the electronic apparatus 100, and may include a menu, a program, an application, etc. executed in the electronic apparatus 100. In other words, when the electronic apparatus 100 performs a predetermined operation and it is thus possible to obtain information about the operation, the voice corrector 144 may correct an error in the recognition result to correspond to the operation of the electronic apparatus 100.

In more detail, when it is impossible for the voice corrector 144 to obtain information about a predetermined operation of the electronic apparatus 100, the voice corrector 144 may use a universal correction model to correct an error in the recognition result. The universal correction model 145 is based on weighted finite state transducers (WFST), which may for example include a grammar WFST that expresses a sentence based on a relationship between words, a dictionary WFST that expresses words based on context independent phones, and a context WFST that converts the context independent phones into context dependent phones.

When it is possible for the voice corrector 144 to obtain information about a predetermined operation of the electronic apparatus 100, the voice corrector 144 may use a situation correction model 146 to correct an error in the recognition result. The situation correction model refers to a unique correction model associated with a predetermined operation of the electronic apparatus 100, and is previously defined adaptively for the operation. The previous definition adaptive for the operation means that the situation correction model previously defined adaptively for a predetermined operation of the electronic apparatus 100 is upgradable by learning a recognition result of an uttered voice, a score of the recognition result, etc. The upgrading of the situation correction model may include that the situation correction model is modified by a speaker.

The function implementor 147 may control the electronic apparatus 100 to implement a specific operation based on a recognition result corrected by the voice corrector 144. The function implementor 147 may control general elements of the electronic apparatus 100 if needed for implementing the specific operation.

Figure 4:
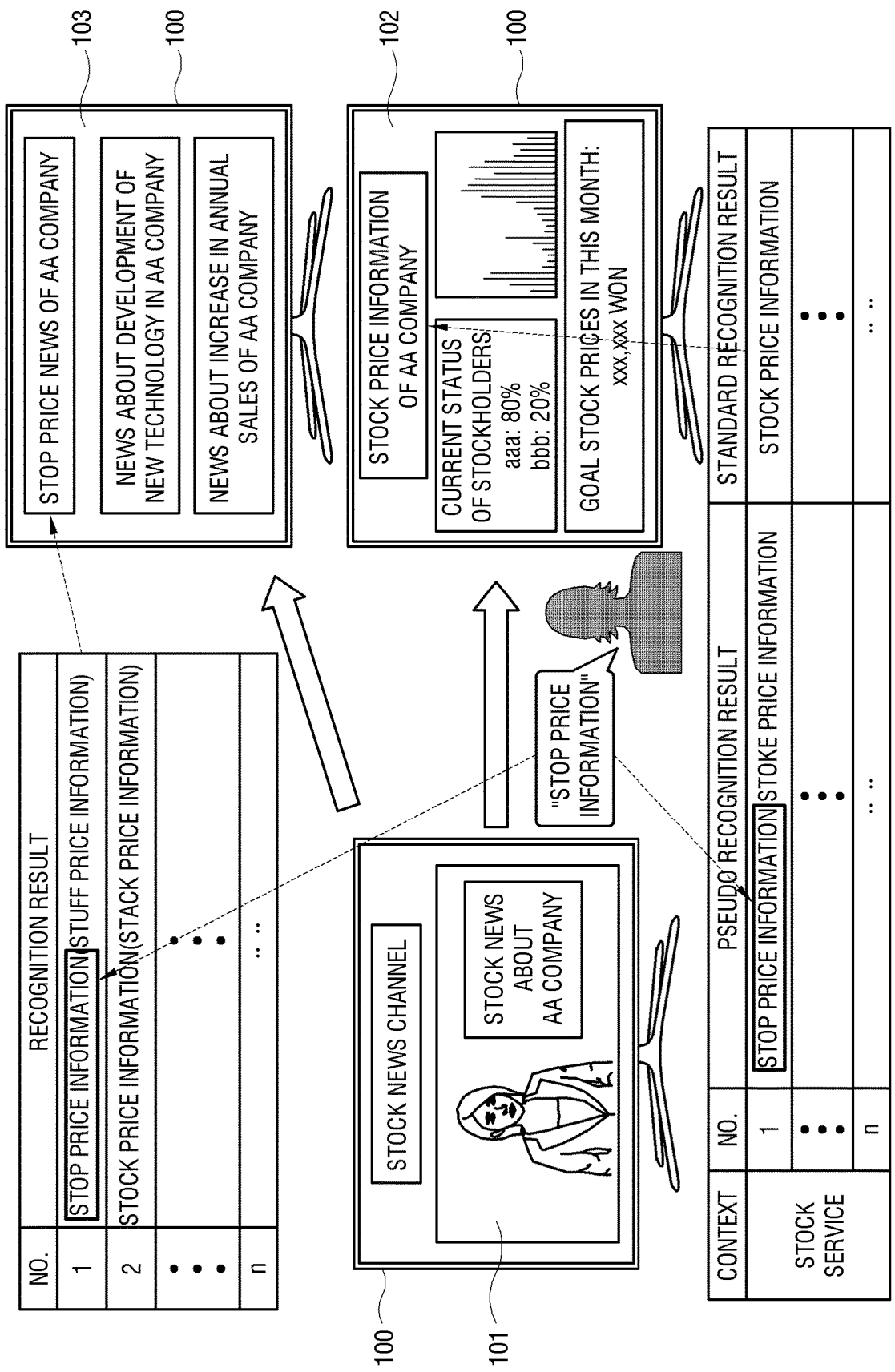
FIG. 4 illustrates a voice control function in the electronic apparatus of FIG. 3.

FIG. 4 illustrates a voice control function in the electronic apparatus of FIG. 3. The reference numeral of '101' in FIG. 4 indicates that the electronic apparatus 100 of FIG. 3 is tuned to a "stock news channel" and displays a program of "stock news about AA company" on the display 150. The program of "stock news about AA company" may be displayed on the display 150 in response to selection of a menu related to the program or execution of the related application. However, the program of "stock news about AA company" is merely an example, and the electronic apparatus 100 may display various programs of various channels without limitations.

When a voice of "stock price information" uttered by a speaker is received during an operation related to the program of "stock news about AA company", the electronic apparatus 100 may obtain a recognition result of "stock price information" and display a program of "stock price information about AA company" based on the recognition result. However, the speaker may not clearly and correctly utter "stock price information" because the use language, the dialect, the grammatical structure, the word, etc. may be varied depending on the nationalities or residential areas, the ages, the linguistic habits, etc. of the speaker. For example, the speaker plans on the program of "stock price information about AA company" and utters "stock price information", but the electronic apparatus 100 may misrecognize "stop price information".

Below, it will be described that the electronic apparatus 100 according to an embodiment displays the program of "stock price information about AA company" based on the utterance intention even though a speaker's utterance intention of "stock price information" is misrecognized as "stop price information".

The electronic apparatus 100 may previously define unique situation correction models respectively associated with predetermined operations. Because there are no limits to the operations of the electronic apparatus 100, the electronic apparatus 100 may define a plurality of situation correction models respectively corresponding to the operations. The electronic apparatus 100 may store the situation correction models in the storage 160.

For example, as shown in FIG. 4, the electronic apparatus 100 may previously define the situation correction model for a context of "stock service". The situation correction model for "stock service" may define "stop price information", "operation information", etc. as pseudo recognition results, and define "stock price information" as a standard recognition result corresponding to the pseudo recognition result.

Because the electronic apparatus 100 displays the program of "stock news about AA company" on the display 150, the situation correction model for the "stock service" may be used in correcting the recognition result from the voice recognition process performed during the operation related to the "stock". The operations related to "stock" may include execution of a menu, a program, and an application related to the "stock", reproduction of an image or a sound related to the "stock", execution of a "home trading system", etc.

When the electronic apparatus 100 obtains a recognition result of "stop price information" through the voice recognition process while displaying the program of "stock news about AA company", the electronic apparatus 100 may correct the recognition result of "stop price information" with reference to the situation correction model of the "stock service" among the plurality of situation correction models because the current operation is related to "stock news".

The electronic apparatus 100 may identify whether the recognition result of "stop price information" matches the pseudo recognition result of the situation correction model of the "stock service". Because "stop price information" is previously defined in the pseudo recognition result, the electronic apparatus 100 may identify that the recognition result of "stop price information" matches the pseudo recognition result of "stop price information". The electronic apparatus 100 may correct the recognition result of "stop price information" into the standard recognition result of "stock price information" corresponding to the pseudo recognition result of "stop price information".

Further, as indicated by the reference numeral of '102 in FIG. 4, the electronic apparatus 100 may display the program of "stock price information about AA company" based on "stock price information" corrected matching the utterance intention. In other words, the electronic apparatus 100 may perform a specific operation matching the utterance intention even though there is an error in the recognition result.

When the electronic apparatus 100 implements a voice control function based on the obtained recognition result of "stop price information" without reference to the situation correction model of the "stock service" about the current operation, the electronic apparatus 100 may display "stop price news about AA company" mismatched with the utterance intention as indicated by the reference numeral of '103' in FIG. 4.

Figure 5:
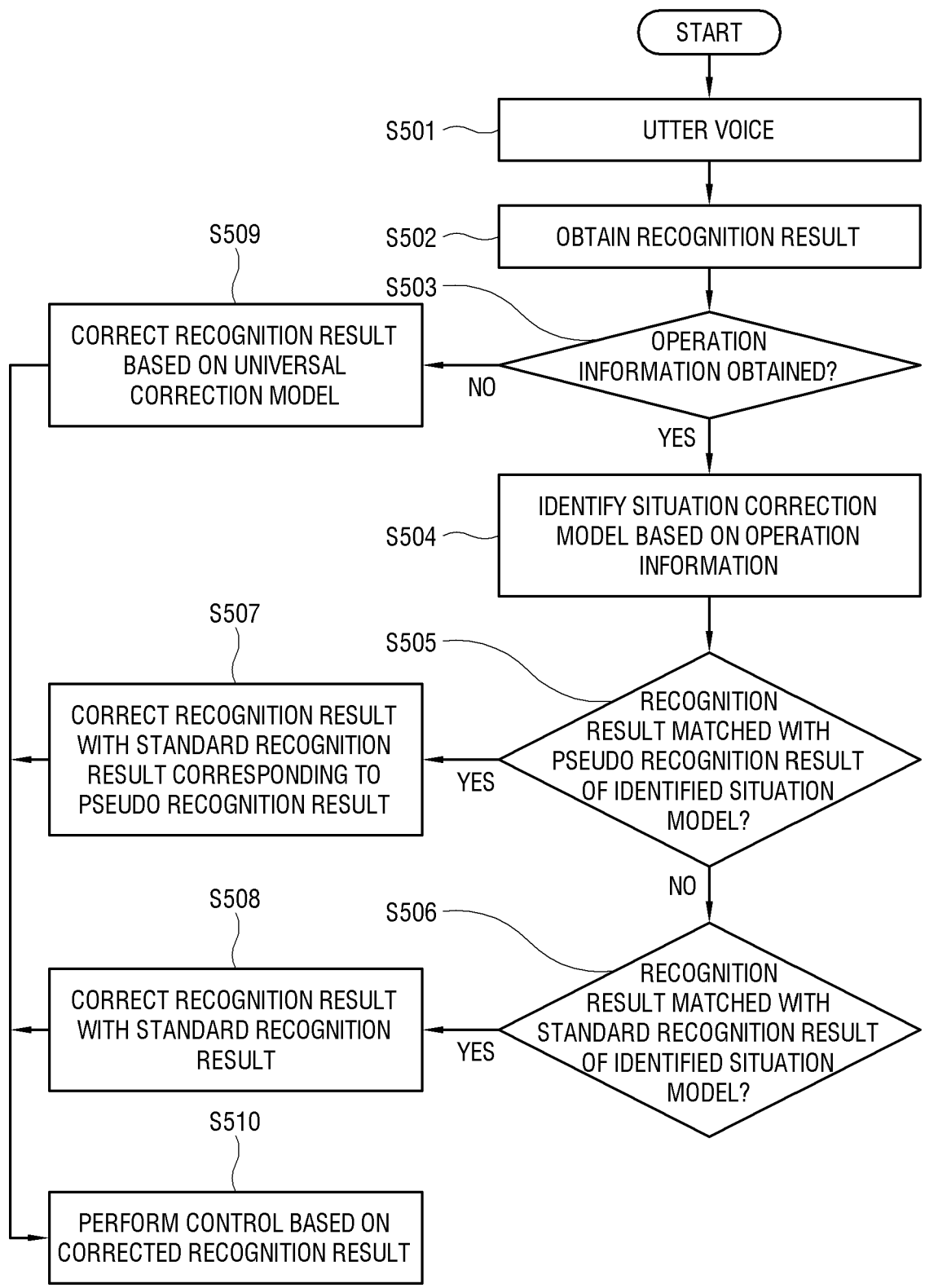
FIG. 5 is a flowchart showing a method of controlling the electronic apparatus of FIG. 4.

FIG. 5 is a flowchart showing a method of controlling the electronic apparatus of FIG. 4. As shown in FIG. 5, when a speaker utters a voice (S501), the electronic apparatus 100 may apply the voice recognition process to the uttered voice to obtain a recognition result (S502). The electronic apparatus 100 identifies whether it is possible to obtain the operation information (S503). The operation information refers to operation about a predetermined operation performed by the electronic apparatus 100. When it is possible to obtain the operation information, the electronic apparatus 100 may identify a situation model corresponding to a situation model corresponding to operation information among a plurality of situation models (S504). The electronic apparatus 100 may be storing situation correction models corresponding to predetermined operations or receive the situation correction models from the outside. The electronic apparatus 100 may identify whether the recognition result matches the pseudo recognition result of the identified situation model (S505). When the recognition result is matched with the pseudo recognition result of the identified situation model, the electronic apparatus 100 may correct the recognition result with the standard recognition result corresponding to the pseudo recognition result (S507). However, when the recognition result is mismatched with the pseudo recognition result of the identified situation model, the electronic apparatus 100 may identify whether the recognition result matches the standard recognition result of the identified situation model (S506). When the recognition result matches the standard recognition result of the identified situation model, the electronic apparatus 100 may correct the recognition result with the standard recognition result (S508). When the recognition result is corrected with the standard recognition result (S507, S508), the electronic apparatus 100 performs control based on the corrected standard recognition result (S510).

On the other hand, when it is impossible to obtain the operation information, the electronic apparatus 100 may correct the recognition result based on the universal correction model (S509). The universal correction model may be based on the WFST. When the universal correction model is used, the electronic apparatus 100 may perform control based on the recognition result of which a sentence pattern error is corrected (S510).

Figure 6:
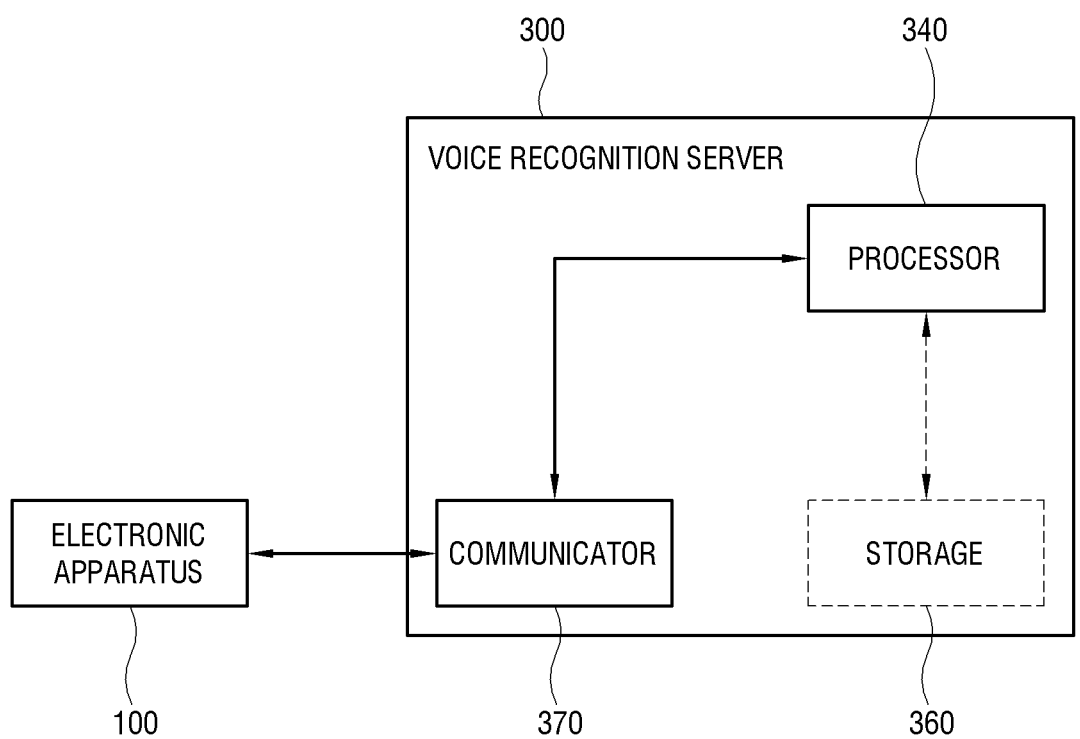
FIG. 6 is a block diagram of a system including the electronic apparatus of FIG. 4.

FIG. 6 is a block diagram of a system including the electronic apparatus of FIG. 4. As shown in FIG. 6, the system may include the electronic apparatus 100 of FIG. 1, and a voice recognition server 300. The voice recognition server 300 may include a processor 340, a storage 360, and a communicator 370 for communication with the electronic apparatus 100.

The voice recognition server 300 may perform some functions of the electronic apparatus 100 of FIG. 4. The voice recognition server 300 may previously define unique situation correction models respectively associated with predetermined operations to be performed in the electronic apparatus 100, under control of the processor 340. Because there are no limits to the operations of the electronic apparatus 100, the voice recognition server 300 may define a plurality of situation correction models respectively corresponding to the operations to be performed by the electronic apparatus 100. The electronic apparatus 100 may store the situation correction models in the storage 160. The voice recognition server 300 may store the plurality of situation correction models in the storage 360.

For example, when the voice recognition server 300 defines the situation correction model about the "stock service", the voice recognition server 300 may define "stop price information", "operation information", etc. as the pseudo recognition results, and define "stock price information" as the standard recognition result corresponding to the pseudo recognition results. With regard to the voice received while the electronic apparatus 100 performs the operation related to "stock", the voice recognition server 300 may correct the recognition result subjected to the voice recognition process. To this end, the voice recognition server 300 may use the situation correction model of "stock service" corresponding to the operation related to "stock" performed by the electronic apparatus 100.

As indicated by the reference numeral of '101' in FIG. 4, it will be assumed that the electronic apparatus 100 displays the program of "stock news about AA company". The voice recognition server 300 may receive a voice signal through the electronic apparatus 100. The voice recognition server 300 may apply the voice recognition process to the voice signal and obtain a recognition result of "stop price information". The voice recognition server 300 may obtain operation information that the current operation of the electronic apparatus 100 is related to "stock news", and thus correct the error of the recognition result of "stop price information" with reference to the situation correction model of the "stock service" among the plurality of situation correction models.

In other words, the voice recognition server 300 may identify whether the recognition result of "stop price information" matches the pseudo recognition result of the situation correction model of the "stock service". Because "stop price information" is previously defined in the pseudo recognition result, the voice recognition server 300 may identify that the recognition result of "stop price information" matches the pseudo recognition result of "stop price information." The voice recognition server 300 may correct the recognition result of "stop price information" into the standard recognition result of "stock price information" corresponding to the pseudo recognition result of "stop price information".

Further, the voice recognition server 300 may transmit data about the standard recognition result of "stock price information" to the electronic apparatus 100. Then, as indicated by the reference numeral of '102' in FIG. 4, the electronic apparatus 100 may display the program of "stock price information about AA company" based on the standard recognition result of "stock price information". In other words, the system may perform a specific operation matching the utterance intention even though there is an error in the recognition result.

When the voice recognition server 300 cannot obtain the operation information about the current operation of the electronic apparatus 100, the voice recognition server 300 may correct the recognition result based on the universal correction model. The correction of the recognition result based on the universal correction model is equivalent to that described with reference to FIG. 4, and thus descriptions thereof will be omitted.

Meanwhile, the voice control function may be variously shared between the electronic apparatus 100 and the voice recognition server 300 according to design methods. For example, the electronic apparatus 100 autonomously applies the voice recognition process to the uttered voice, and provide the recognition result obtained by the voice recognition process to the voice recognition server 300. Alternatively, the electronic apparatus 100 may transmit a voice signal to a speech-to-text (STT) sever, and receive a text corresponding to the voice signal from the STT server. The electronic apparatus 100 may performs the voice recognition process based on the received text, thereby obtaining the recognition result. As necessary, the STT server may transmit the text corresponding to the voice signal to not the electronic apparatus 100 but the voice recognition server 300, and the voice recognition server 300 may perform the voice recognition process to obtain the recognition result.

Figure 7:
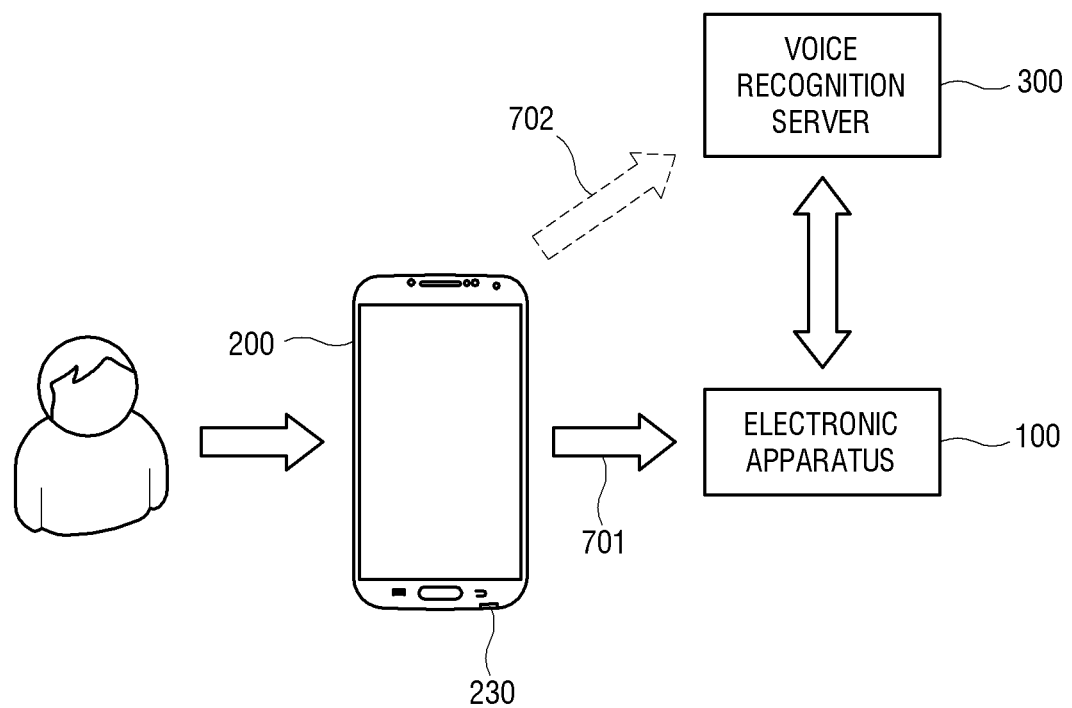
FIG. 7 illustrates that the electronic apparatus of FIG. 3 receives a voice through an external apparatus.

FIG. 7 illustrates that the electronic apparatus of FIG. receives a voice through an external apparatus. The electronic apparatus 100 may receive an uttered voice through the voice receiver 130, but may receive a digital signal about the voice from an external apparatus 200 as indicated by the reference numeral of '701' in FIG. 7. In other words, when the external apparatus 200 receives the uttered voice, converts the uttered voice into the digital signal about the voice and transmits the digital signal to the electronic apparatus 100, the electronic apparatus 100 may perform the voice recognition process based on the digital signal about the voice. Operations of the electronic apparatus 100 subsequent to the voice recognition process are equivalent to those described with reference to FIG. 3, and thus descriptions thereof will be omitted.

The external apparatus 200 may be embodied by a remote controller, a smartphone, or the like portable mobile apparatus. When the external apparatus 200 is embodied by the potable mobile apparatus, the external apparatus 200 may install an application therein for a function of controlling the electronic apparatus 100 like the remote controller, or a function of performing the voice recognition process like the electronic apparatus 100 of FIG. 3. In particular, when the external apparatus 200 executes the application for the voice recognition process to apply the voice recognition process to the uttered voice, the electronic apparatus 100 may receive the recognition result of the voice recognition process from the external apparatus 200. Operations of the electronic apparatus 100 subsequent to the reception of the recognition result are equivalent to those described with reference to FIG. 3, and thus descriptions thereof will be omitted.

The communicator 170 of the electronic apparatus 100 may use various communication standards, for example, Wi-Fi, Bluetooth, IrDA, etc. to communicate with the external apparatus 200. To communicate with the external apparatus 200, the electronic apparatus 100 may use the communicator 170 for communication with the voice recognition server 300, but may use a separate communicator.

Meanwhile, as indicated by the reference numeral of '702' in FIG. 7, the external apparatus 200 may provide the digital signal about the voice or the recognition result to the voice recognition server 300. In this case, the external apparatus 200 may additionally provide information about the electronic apparatus 100, so that the voice recognition server 300 can specify the electronic apparatus 100. When the external apparatus 200 provides the digital signal about the voice to the voice recognition server 300, the voice recognition server 300 performs the voice recognition process based on the digital signal. The following operations of the voice recognition server 300 are equivalent to those described with reference to FIG. 6, and thus descriptions thereof will be omitted.

The invention claimed is:
1. An electronic apparatus comprising:
a voice receiver configured to receive a user voice input; and
a processor configured to:
perform a first function of a service including a context,
obtain a recognition result by a voice recognition for the user voice input received by the voice receiver while the first function is performed, and
based on the obtained recognition result matching a standard recognition result or a pseudo recognition result corresponding to the standard recognition result, perform a second function based on the standard recognition result,
wherein the standard recognition result and the pseudo recognition result are identified based on the context of the service where the first function is performed.
2. The electronic apparatus according to claim 1, wherein the processor is further configured to select at least one correction model corresponding to the performed first function among a plurality of correction models respectively provided according to a plurality of functions.
3. The electronic apparatus according to claim 2, wherein the processor is configured to identify whether the obtained recognition result matches at least one previously defined pseudo recognition result of the at least one selected correction model.

4. The electronic apparatus according to claim 3, wherein the processor is further configured to identify whether the obtained recognition result matches the standard recognition result previously defined and corresponding to the pseudo recognition result of the at least one selected correction model.

5. The electronic apparatus according to claim 2, further comprising a storage configured to store the plurality of correction models respectively provided according to the plurality of functions.

6. A method of controlling an electronic apparatus comprising a voice receiver configured to receive a user voice input, the method comprising:
- performing a first function of a service including a context;
- obtaining a recognition result by a voice recognition for the user voice input received by the voice receiver while the first function is performed; and
- based on the obtained recognition result matching a standard recognition result or a pseudo recognition result corresponding to the standard recognition result, performing a second function based on the standard recognition result,
- wherein the standard recognition result and the pseudo recognition result are identified based on the context of the service where the first function is performed.

7. The method according to claim 6, wherein the performing the second function comprises selecting at least one correction model corresponding to the performed first function among a plurality of correction models respectively provided according to a plurality of functions.

8. The method according to claim 7, wherein the performing the second function further comprises identifying whether the obtained recognition result matches at least one previously defined pseudo recognition result of the at least one selected correction model.

9. The method according to claim 8, wherein the identifying comprises identifying whether the obtained recognition result matches the standard recognition result previously defined and corresponding to the pseudo recognition result of the at least one selected correction model.

10. The method according to claim 7, further comprising storing the plurality of correction models respectively provided according to the plurality of functions.

11. A voice recognition system comprising an electronic apparatus and a voice recognition server,
- the electronic apparatus comprising a voice receiver configured to receive a voice of a speaker, and
- the voice recognition server comprising:
  - a communicator configured to communicate with the electronic apparatus; and
  - a processor configured to
    - receive a user voice input, which is received in the voice receiver during a first function performed by the electronic apparatus,
    - through the communicator, obtain a recognition result by a function corresponding to a voice recognition for the received user voice input while the first function is performed, and
    - based on the obtained recognition result matching a standard recognition result or a pseudo recognition result corresponding to the standard recognition result, perform a second function based on the standard recognition result,
  - wherein the standard recognition result and the pseudo recognition result are identified based on a context of a service where the first function is performed.

12. The voice recognition system according to claim 11, wherein the processor of the voice recognition server is configured to select at least one correction model corresponding to the performed first function among a plurality of correction models respectively provided according to a plurality of functions.

13. The voice recognition system according to claim 12, wherein the processor of the voice recognition server is further configured to identify whether the obtained recognition result matches the at least one previously defined pseudo recognition result of the at least one selected correction model.

14. The voice recognition system according to claim 13, wherein the processor of the voice recognition server is further configured to identify whether the obtained recognition result matches the standard recognition result previously defined and corresponding to the pseudo recognition result of the at least one selected correction model.

15. A non-transitory computer-readable recording medium storing a computer program to be executed by a processor to perform a method to control an electronic apparatus comprising a voice receiver configured to receive a user voice input, the method comprising:
- performing a first function of a service including a context;
- obtaining a recognition result by a voice recognition for the user voice input received by the voice receiver while the first function is performed; and
- based on the obtained recognition result matching a standard recognition result or a pseudo recognition result corresponding the standard recognition result, performing a second function based on the standard recognition result,
- wherein the standard recognition result and the pseudo recognition result are identified based on the context of the service where the first function is performed.

* * * * *